United States Patent [19]

Elwell

[11] 4,362,570

[45] Dec. 7, 1982

[54] SOLVENT MIXTURE FOR REMOVING POLYSULFIDE AND SILICONE RUBBER COATINGS

[75] Inventor: John J. Elwell, Hooper, Utah

[73] Assignee: The United States of America as represented by the Secretary of the Air Force, Washington, D.C.

[21] Appl. No.: 310,689

[22] Filed: Oct. 13, 1981

[51] Int. Cl.³ ............................................... C09K 3/00
[52] U.S. Cl. ..................................... 106/311; 134/38; 134/39
[58] Field of Search ................ 106/311; 252/171, 172; 134/38, 39

[56] References Cited

U.S. PATENT DOCUMENTS

| | | | |
|---|---|---|---|
| 2,286,763 | 6/1942 | Rochow | 260/607 |
| 2,413,049 | 12/1946 | Hyde | 260/607 |
| 2,507,521 | 5/1950 | Clark | 528/9 |
| 2,762,825 | 9/1956 | Kautsky et al. | 260/448.2 |
| 3,808,249 | 4/1974 | Koshar | 260/448.2 N |

Primary Examiner—Theodore Morris
Attorney, Agent, or Firm—Donald J. Singer; William J. O'Brien

[57] ABSTRACT

A solvent for dissolving and removing polysulfide and polysilicone rubber coatings from a metal substrate. The solvent is composed of a mixture of dichloromethane and a minor amount of a chlorotrimethylsilane.

1 Claim, No Drawings

SOLVENT MIXTURE FOR REMOVING POLYSULFIDE AND SILICONE RUBBER COATINGS

STATEMENT OF GOVERNMENT INTEREST

The invention described herein may be manufactured and used by or for the Government for governmental purposes without the payment of any royalty thereon.

BACKGROUND OF THE INVENTION

This invention relates to a solvent composition. In a more particular manner, this invention concerns itself with a solvent mixture particularly adapted for use in dissolving and removing cured polysulfide and silicone rubber coatings, sealant, paints and encapsulants from metal substrates.

Polysulfide rubber compositions, as well as silicone rubber compositions, are a well known class of polymeric resins that find wise use as protective encapsulants for electrical and electronic components. However, in order to effect the repair and maintenance of these components; it often becomes necessary to remove the encapsulated coatings. Unfortunately, previous attempts at dissolving and removing such sulfides and silicone rubbers required the use of strong organic acid solvents coupled with severe grinding or abrasion efforts. Oftentimes, the use of severe grinding and strong solvents resulted in extensive damage to the electronic component. As a consequence, repair of the component became a practical impossibility resulting in economic loss due to the fact that the component had to be discarded.

In order to avoid economic losses as well as health and safety hazards due to the use of strongly corrosive acid solvents, it was found necessary to develop a solvent mixture that would prove effective in dissolving and removing polysulfide and silicone rubber formulations from electronic components whether in the form of a coating or protective encapsulant. As a consequence, the solvent mixture of this invention was developed and found to be effective in dissolving such coatings due to its ability to catalytically depolymerize the silicone and polysulfide rubber formulations. The efficient removal of these rubberized formulations from electronic components, fuel tanks and other structural elements provided an effective means for the repair and maintenance of a variety of aerospace systems, thus eliminating, to a great extent, the high cost encountered in previous maintenance programs.

SUMMARY OF THE INVENTION

As a result of the research effort generated in response to the urgent need for repairing and maintaining encapsulated electronic parts and fuel tanks without unnecessary expense and within a safe and non-hazardous environment, it was found that a solvent mixture composed of a mixture of dichloromethane and chlorotrimethylsilane overcame the problems associated with the prior art methods for removing polysulfide and silicone rubber protective coatings. The solvent mixture of this invention has proved to be effective due to its ability to depolymerize the rubbery encapsulant. An additional abrading or grinding action, which often results in extensive damage to the encapsulated parts, is not needed. It appears that the chlorotrimethylsilane acts as a catalyst in the solvent mixture and is effective in cleaving the sulfur-sulfur chemical bonding, as well as the silicon-carbon bonding, when used in a dichloromethane solvent.

Accordingly, the primary object of the present invention is to provide a solvent solution that is particularly adapted for dissolving and removing polysulfide or silicone rubber formulations from metal substrates.

Another object of this invention is to provide a solvent solution that effectively removes polysulfide and silicone rubber sealants and encapsulants without resorting to ancillary abrading techniques.

Still another object of this invention is to provide a solvent solution for dissolving polysulfide and silicone rubber formulations without relying on the use of strong acid solvents, thereby minimizing the health and safety hazards normally associated with the use of such solvents.

The above and still other objects and advantages of this invention will become more readily apparent upon consideration of the following detailed disclosure thereof.

DESCRIPTION OF THE PREFERRED EMBODIMENT

In accordance with this invention, it has been found that the aforementioned objects can be carried out by a solvent solution that depolymerizes polysulfide and silicone rubber formulations by effectively cleaving the sulfur-sulfide bond of the polysulfide and the silicon carbon bonding structure of the silicone rubber. Cleavage of depolymerization of the chemical bond is achieved by the addition of chlorotrimethylsilane as an essential ingredient of the basic dichlormethane solvent. The depolymerizing action affects the adhesive bonding that exists between the rubber encapsulant or coating and the metal substrate to which the coating adheres, thereby facilitating the easy removal of the coating with minimal or no damage to the substrate.

In order to more clearly describe the present invention and point out with particularity the nature of the solvent solution contemplated thereby, the following example is presented. It should be understood, however, that the example is presented only to illustrate a specific embodiment of the invention and is not intended to limit the invention in any way.

EXAMPLE

| Ingredient | Percent by Volume |
| --- | --- |
| Dichloromethane ($CH_2Cl_2$) | 94 |
| Chlorotrimethylsilane | 6 |

The solution illustrated in the example has been successfully used to remove polysulfide coatings from electronic circuit boards with minimal damage. It has also been employed successfully in the removal of cured polysulfide and silicone rubber from electronic components. Additionally, it has found utility in the removal of polysulfide sealants from aircraft fuel tanks.

The invention is best put into effect by preparing a suitable amount of the solvent mixture having a compositional content as shown in the example heretofore. The structural component or component part that is coated or encapsulated with either a polysulfide or silicone rubber formulation is then immersed into the solvent mixture. The coated part is exposed to the action of the solvent for a period of time sufficient to soften the coating at which time the part is removed from the solvent mixture and the coating is removed by merely scraping, washing or through the use of hydrolytic or gas pressure. The removal time will vary since it is highly dependent upon the particular formulation being removed. The cleansed part may be rinsed with methanol or dichloromethane, if desired, in order to allow for more rapid drying.

The utilization of the solvent mixture of this invention eliminates the strong acid solvents and abrading techniques formerly relied upon in removing polysulfide and silicone rubber coatings from electronic circuit boards. It facilitates their repair and maintenance and minimizes the serious health hazards encounted by persons who used previously known solvent removal techniques. It also allows for the repair of encapsulated electronic components which were previously discarded because no effective method was available for dealing with the removal of their protective encapsulants. In addition, the solvent solution provides for the rapid and effective removal of cured polysulfide and silicone rubber sealants from metal panels without resorting to the prior art techniques of grinding and severe a brading with often resulted in severe damage to the surface of the metal panels.

While there has been described a particular embodiment of the invention, it should be understood by those skilled in the art to which the subject matter of the present invention pertains, that various alterations and modifications may be resorted to without limiting the invention in any way since the scope of the invention is defined by the appended claims.

What is claimed is:

1. A solvent solution for effectively removing a cured, polysulfide or silicone rubber, protective coating formulation from a substrate, said solvent solution consisting essentially of a mixture of about 94 volume percent dichloromethane and about 6 volume percent chlorotrimethylsilane.

* * * * *